Archibald G. Mandry
Inventor
per B. Anger,
Attorney

UNITED STATES PATENT OFFICE.

ARCHIBALD GEORGE MANDRY, OF EAST DULWICH, ENGLAND.

MEANS FOR FIXING DETACHABLE LEGS TO TABLES.

1,372,032.　　　　Specification of Letters Patent.　　Patented Mar. 22, 1921.

Application filed April 30, 1920. Serial No. 377,741.

*To all whom it may concern:*

Be it known that I, ARCHIBALD GEORGE MANDRY, a subject of the King of Great Britain, residing at 74 Beauval road, East Dulwich, in the county of London S. E., England, have invented certain new and useful Improvements in Means for Fixing Detachable Legs to Tables, of which the following is a specification.

My invention relates to an improved method of securing detachable legs to tables.

The objects of my invention are to provide a simple means of obtaining perfect rigidity and strength when such legs are fixed to position, to provide improved means for making said legs easily detachable when desired for facilitating transport, and at the same time to preserve a neat and finished appearance to the frame to which such legs are attached.

According to my invention, I provide a metal plate of a suitable length having its longitudinal edges bent upward at any suitable angle so as to form an angle bracket, the side flanges having holes drilled therethrough for the accommodation of fixing screws. In the center portion or face of said angle bracket, I provide a slot or hole of suitable size to receive a round-headed bolt, or bolts with square shanks, or in certain cases a series of holes may be drilled at suitable points. The bolts may be provided with any approved form of nut and washer for effecting quick release, or if desired, a lock nut may be provided.

The angle bracket may either be made from a sheet metal blank, casting, drop forging or the like. When fixing the legs in position to a rectangular table, the bolts are first inserted into the slots or holes in the center portion of the bracket and the flanges of the bracket are secured with screws to the internal angle of the under frame of the table. The under frame in this case will be a complete one, that is to say, the corners thereof will be jointed or dovetailed, in contra distinction to the table under frame at present used where the sides and ends of the frame are tenoned into the top portion of the leg. The angle or set of the flanges of the bracket will of course be determined by the type of table frame, that is, whether rectangular, polygonal, circular or elliptical.

The bolts are then passed diagonally through holes in the upper portion of the detachable leg, assuming that this is of square section and the leg is secured by means of the aforementioned nuts. In the particular case of a table leg having a square section top, the corner of the leg adjacent to the center portion of the bracket and its diagonally opposite corner are preferably chamfered, so as to form a bearing surface for the bracket, nuts and washers.

The top portion of the leg which is housed within the angle of the under frame will preferably be of a reduced section so as to allow of the lower square portion of the leg being flush with the exterior of the under frame.

Although described with reference to tables only, it will be obvious that the invention can be easily applied to similar articles in which legs, stands or supports are required to be easily detached.

The invention will be more readily understood from the accompanying drawings in which:—

Figure 1:
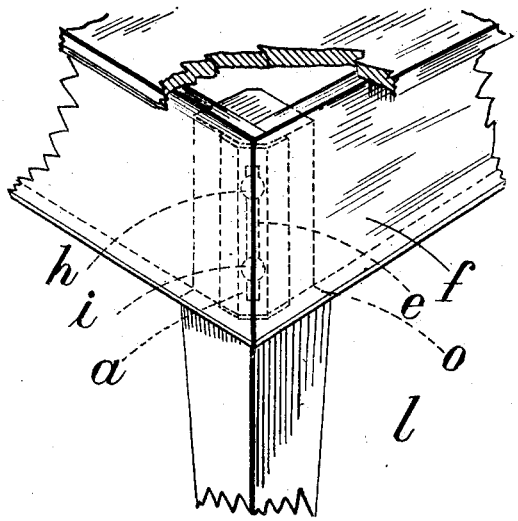
Figure 1 is a perspective view of a table leg secured in position with the angle of the frame.
Figure 2:
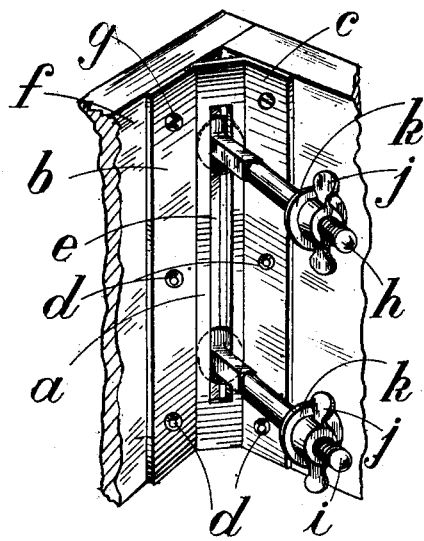
Fig. 2 is a perspective view of the angle bracket with bolts and nuts shown in position.

Referring first to Figs. 1 and 2, a metal plate "A" has its longitudinal edges bent so as to form an angle bracket with flanges "B", "C," the said flanges being drilled as at "D" for the reception of fixing screws. A longitudinal slot "E" is made in the center portion of the bracket, or instead, holes may be drilled therein. The bracket is secured to the under frame "F" by screws "G," bolts such as "H" and "I" having first been pushed through the slot so that the heads protrude beyond the angle brackets as shown.

A round headed bolt of the type indicated, having a square on the shank portion to prevent turning is preferred but other suitable forms may be substituted. A wing nut "J" and washer "K" as shown is provided for securing the leg "L" in position, but an ordinary nut or lock nut may be used.

Figure 3:
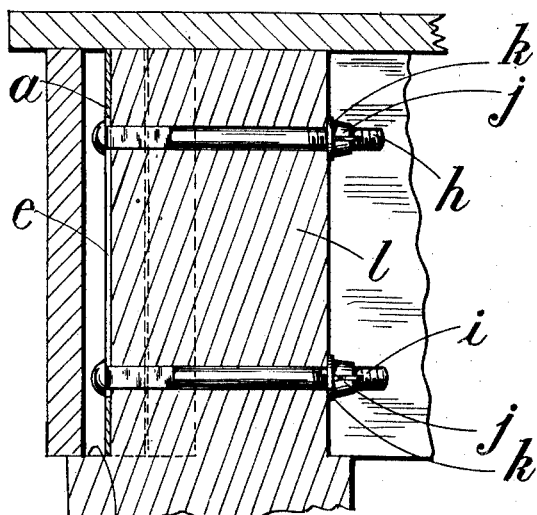
Figs. 3 and 4 are longitudinal and transverse sections respectively of the upper portion of a table leg secured in position.
Figure 4:
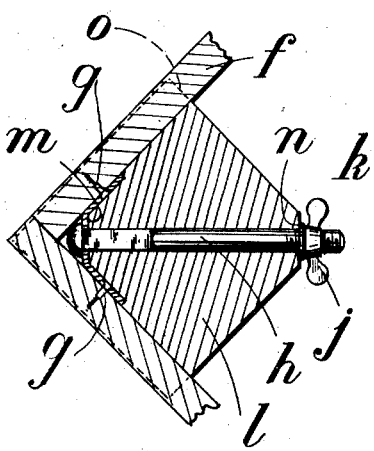

Referring now to Figs. 3 and 4, transverse holes are made in the top portion of the leg "L," the bolts are passed through these holes and the leg is secured in position by means of the nuts "J" the flat surfaces "M" and "N" materially assisting in obtaining a good bearing surface for the bracket "A," and the nuts "J, J," and the washers "K, K." The bracket "A" may either be recessed into the inner sides of the frame or the portion of the leg which is immediately adjacent to the bracket may be cut away as shown so as to insure a good fit into the angle of the frame. The leg is preferably shouldered at "O" in order that the square portion of the leg which depends below the under frame may be in alinement with the corner of the frame or approximately so. This shoulder will also add to the rigidity of the leg in relation to the frame.

By the use of this invention the advantage is attained that the legs are held perfectly rigid, it is not necessary to have the mortised and tenoned joints at the corners of the frame when the legs are interposed, while the frame does not come apart when the legs are removed.

I claim:—

The combination of a table frame, a leg having its upper end arranged in a corner of said frame and provided with shoulders bearing against the lower edges of the sides of said frame, two of the sides of the leg also bearing against the inner surfaces of the said sides of said frame and one corner of the leg being spaced from said corner of the frame, a metal angle bracket having an intermediate portion provided with a vertical slot, and bearing against said corner of the leg, said bracket also having side flanges secured to the said sides of the frame and arranged between said sides and the abutting sides of the leg, and bolts extending through openings in the leg and also through said slot, said bolts having heads arranged in the space between the corner of the frame and the intermediate portion of the bracket, and bearing against said intermediate portion, and nuts on said bolts bearing against the inner corner of the leg.

In testimony whereof I affix my signature in the presence of two witnesses.

ARCHIBALD GEORGE MANDRY.

Witnesses:
CHARLES WALTON,
C. R. PERKINS.